Mar. 27, 1923

C. O. STANLEY

SPRING WHEEL

Filed Mar. 22, 1920

1,449,920

Inventor
Charles O. Stanley
by Geyer & Popp
Attorneys.

Patented Mar. 27, 1923.

1,449,920

UNITED STATES PATENT OFFICE.

CHARLES O. STANLEY, OF BUFFALO, NEW YORK, ASSIGNOR OF ONE-HALF TO JOHN M. ANDREWS, OF BUFFALO, NEW YORK.

SPRING WHEEL.

Application filed March 22, 1920. Serial No. 367,599.

*To all whom it may concern:*

Be it known that I, CHARLES O. STANLEY, a citizen of the United States, residing at Buffalo, in the county of Erie and State of New York, have invented new and useful Improvements in Spring Wheels, of which the following is a specification.

This invention relates to an airless vehicle wheel in which the concussions of road travel are principally absorbed by means of metal springs.

One of the objects of the invention is to provide a solid tire, vehicle wheel which will avoid the use of the usual troublesome pneumatic tube and casing and yet obtain the well-known easy riding qualities of the pneumatic tire.

A further object of the invention is to provide a vehicle spring wheel in which a large portion of the force of the concussions are absorbed by frictional resistance, thereby preventing the undue rebound of the elastic moving parts.

A still further object of the invention is to provide a dust proof resilient wheel to which a hard rubber tire or tread may be easily applied; and in such manner as to prevent any creeping of said rubber on the metal rim to which it is attached.

Figure 1:
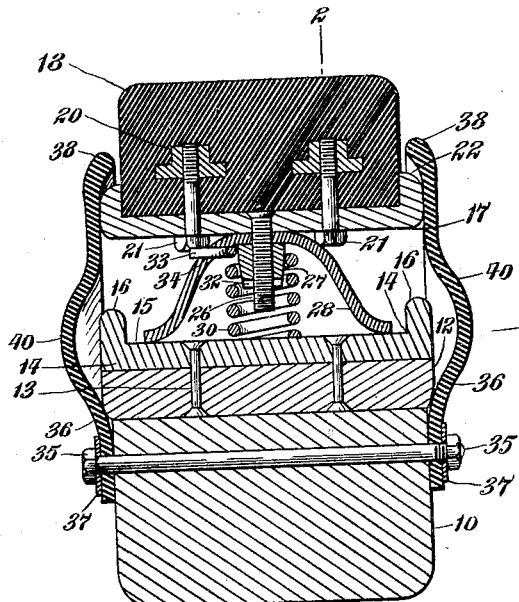
Figure 2:
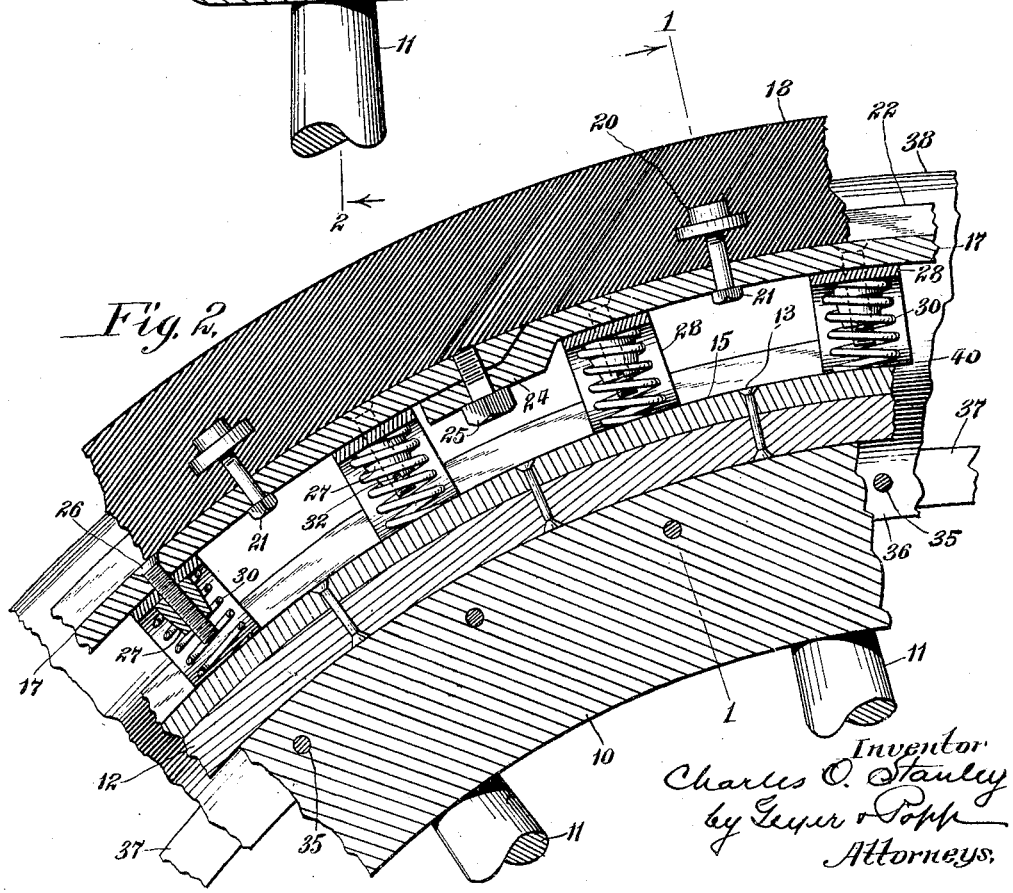

Further objects and advantages will appear more clearly from the following description and the accompanying drawings, wherein:

Figure 1 is a fragmentary radial section through the spring wheel taken on line 1—1, Fig. 2. Figure 2 is a fragmentary vertical section through the wheel taken in a plane perpendicular to the axis of the wheel on line 2—2, Fig. 1.

Similar characters of reference indicate corresponding parts in both views.

As is common in the vehicle wheel art, this invention consists primarily of an annular or ring-shaped felly 10 constructed of wood or other suitable material and joined to the customary hub (not shown) of the wheel by a plurality of artillery or other spokes 11 which extend out radially from said hub and are suitably connected at their outer ends to the inner edge of said felly. Suitably shrunk against the outer or peripheral flat face of said felly 10 is the usual shrink ring 12, to which is secured by rivets 13 or otherwise, an annular wear band 14, whose flat outer annular face 15 is concentric with the axis of the felly 10. The opposite edges of said wear band are provided with outwardly or radially-extending, annular stop flanges 16, whose outer radial faces are arranged substantially flush with the outer faces of the aforesaid shrink ring 12 and whose inner radial faces form the outside terminii of the outer face 15 of said wear band 14.

Arranged outside of said wear band but in spaced relationship thereto, is an annular rim 17, which, for traction purposes, carries a hard rubber tire or tread 18 on its outer face. To prevent any creeping of the said rubber tire relatively to the said rim 17, a number of draw nuts 20 are suitably embedded or moulded in the body or core of said tire, and a number of tire bolts 21 are arranged to be radially screwed through the rim 17 and into the said draw nuts 20, the heads of said tire bolts bearing against the inner face of said rim. The rim is provided on its peripheral or outer face along its opposite edges thereof with retaining flanges 22 which are adapted to bear against opposite sides of the rubber tire and prevent the same from becoming detached from the rim. To avoid the necessity of stretching the rubber tire over these retaining flanges 22 when applying the same to the rim, the latter is split, so as to permit of decreasing its diameter and thereby facilitating the applying of the tire to or the removal of the same from said rim. The one end 24 of the rim extends inwardly of and overlaps the other end of the rim and when the rim has been distended or expanded to its proper position, as shown in the drawings, a rim bolt 25 is passed through suitable holes in the overlapping ends of the rim, thereby securing the same rigidly together, so that thereafter the rim acts as if it were integral.

Radially secured to the central part of the inner face of the rim 17 are a number of inwardly-extending studs 26 whose inner ends carry nuts 27. Clamped between each of said nuts and the adjacent inner face of the rim 17 is a bow-shaped, flat spring 28 which is longitudinally disposed in a plane parallel to the axis of the spring wheel, and bears with its inner, curled, end-faces against the outer surface 15 of the rim. When the rim and tire are caused to move radially inward toward the hub of the wheel by reason of concussions resulting from irregularities in the roadway, the bow-shaped spring 28 is caused to be flexed and flattened out, which causes the opposite end faces thereof to slide outwardly on the said face 15 of the wear band 14. This flexing movement of the said spring is strongly retarded by the frictional resistance of the end faces of said spring sliding or rubbing against the said face 15 of said wear band 14, so that when the externally applied force is removed from the tire, this spring cannot rebound or snap back with the same force which it originally received, because a considerable portion of this force or concussion has been converted into frictional resistance or heat, which of course, cannot regain its former mechanical state, but instead is dissipated merely as heat. After a certain amount of flexure of this bow-shaped spring 28, the opposite ends of the same are caused to make contact with the inner faces of the stop flanges 16 of the wear band 14. Any further pressure beyond this amount, of flexure will be met by a much greater resilient force than before, inasmuch as the spring will be rendered much stiffer and stronger and more resistant, by reason of the change in the relationship of the implied force to the plane of the spring. The spring flexure which occurs after the opposite ends of said spring 28 have contacted with the stop flanges 16, is limited in its action by a contacting of the inner end of the stud 26 against the face 15 of the said wear band 14. The bow-shaped spring 28 is relieved of some of the pressure imposed upon it by reason of a helical or coiled spring 30 which is disposed radially of the wheel and coaxially with its companion stud 26 and which bears with its outer and inner ends respectively against the bow-shaped spring and the face 15 of the wear band 14. The spring is suitably centered relatively to the stud 26 by reason of the aforementioned nut 27 which is snugly received within the upper hollow part of said helical spring. This nut not only serves to center the said helical spring 30 but also serves to hold the bow-shaped spring 28 against the rim 17, as previously described. The inner end of the nut is beveled or tapered inwardly so as to avoid any possible interference with the coils of the helical spring, as the same is flexed, and the inner face thereof is provided with a suitable screw driver slot 32, so that the nut may be readily screwed into place. To prevent the helical spring 30 from becoming dislocated, the upper end of the same is given a sharp bend 33 which extends radially outwardly and passes through a suitable hole 34 in the bow-shaped spring 28. Secured by bolts 35 to each side face of the felly 10 is an annular dust flap 36, the heads and nuts of said bolts bearing against an annular metal ring 37 which is provided with suitable holes to receive said bolts 35 and is adapted to snugly hold the dust flap against the felly throughout its circumferential length so as to cause a tight, dust proof joint between said dust flap and the felly. This dust flap is constructed of rather stiff rubber reinforced by cotton fabric or any other similar suitable material and the outer edge or periphery of the flap is thickened considerably at 38 so as to not only strengthen the same but also to grip the outer edge of the companion flange 22 as the same moves outwardly into engagement with said edge 38. Any further outward movement of the rim is thereby constrained to carry the outer part of said dust flap with it. To permit of this action and generally to obtain the required resiliency the circumferential portion of said dust flap intermediate of its inner edge and its periphery is circumferentially bellied or dished at 40, the dust flap being suitably stiff to resiliently hold this form or shape.

It is apparent on the whole that the spring wheel is strong and reliable and yet, at the same time, soft and cushiony in its resilient action, without any harsh rebounds or vibrations. The first part of the flexure of the bow-shaped spring 30 results from but comparatively small external forces which are almost entirely absorbed in the frictional moving contact of said spring against the face 15 of the wear band 14. Any further flexures of the bow-shaped spring are met by a greatly increasing resistance by reason of the contacting of the opposite ends of said bow-shaped spring against the inner faces of the stop flanges 16. These flanges also prevent the outer rim 17 and the parts connected thereto from becoming disengaged from the said wear band 14, and the rest of the wheel proper. The rubber tire 18 is prevented from creeping on the rim by reason of the drawn nuts 20 and tire bolts 21 and the tire is restrained against lateral movement by reason of the flanges 22. These flanges however do not impede the placing of the tire on the rim nor the removal of said tire from the same by reason of the fact that the rim 14 is split and is provided with overlapping ends which are connected by an easily accessible bolt 25. The space intermediate of the rim 17 and the wear band 14 provides for the accessibility of all the working parts of the spring wheel. Furthermore, the peculiar cross sectional shape of the dust flaps makes them strong and durable and yet readily flexible and yielding to the movements of the outer rim.

I claim as my invention:

A spring wheel comprising a rim provided with a tire, a stud extending inwardly from said rim, a felly, a helical spring disposed between said rim and said felly and surrounding said stud, a tapered nut arranged on said stud and adapted to center said spring and to guide the flexing movement thereof, and a transverse bow spring having its central part secured between said nut and rim and bearing at its opposite ends against said felly.

CHARLES O. STANLEY.